United States Patent
Clayton et al.

(10) Patent No.: US 8,342,218 B2
(45) Date of Patent: Jan. 1, 2013

(54) APPARATUS FOR MANUFACTURING A TUBULAR PRODUCT

(75) Inventors: Patrick Clayton, Worthing (GB); Patrick M. Hester, Pulborough (GB)

(73) Assignee: Lamina Dielectrics Limited, Billingshurst (GB)

( * ) Notice: Subject to any disclaimer, the term of this patent is extended or adjusted under 35 U.S.C. 154(b) by 929 days.

(21) Appl. No.: 12/314,254

(22) Filed: Dec. 5, 2008

(65) Prior Publication Data
US 2009/0145194 A1    Jun. 11, 2009

(30) Foreign Application Priority Data
Dec. 7, 2007    (GB) .................................. 0723936.1

(51) Int. Cl.
*B32B 37/06* (2006.01)
(52) U.S. Cl. .................................................. 156/379.6
(58) Field of Classification Search ............... 156/379.6, 156/379.8, 380.1, 380.9, 433
See application file for complete search history.

(56) References Cited

U.S. PATENT DOCUMENTS

| | | | | |
|---|---|---|---|---|
| 4,144,700 A | * | 3/1979 | Takai et al. | 57/264 |
| 4,563,231 A | * | 1/1986 | Porrmann et al. | 156/90 |
| 2004/0166257 A1 | * | 8/2004 | Pierce et al. | 428/34.1 |
| 2007/0169877 A1 | * | 7/2007 | Leeflang et al. | 156/218 |
| 2009/0145547 A1 | * | 6/2009 | Clayton et al. | 156/272.8 |

FOREIGN PATENT DOCUMENTS

| | | |
|---|---|---|
| DE | 19954440 | 6/2001 |
| DE | 10303534 | 8/2004 |
| GB | 552737 | 4/1943 |
| GB | 1021032 | 2/1966 |
| JP | 2000-141469 | 5/2000 |
| JP | 2003 071915 | 3/2003 |
| WO | WO 2007/043935 | 4/2007 |

* cited by examiner

*Primary Examiner* — Daniel McNally
(74) *Attorney, Agent, or Firm* — Levy & Grandinetti

(57) ABSTRACT

Apparatus for manufacturing a tubular product comprising a tube forming means, a tube maintaining means, a drawing means and energy application means, in which the tube forming means comprises a formation aperture or series of apertures adapted to form a subject material drawn therethrough into a tubular shape, in which the tube maintaining means comprises a circular aperture or series of apertures adapted to maintain the subject material drawn therethrough in the tubular shape, in which the drawing means is adapted to draw the subject material through the tube forming means and the tube maintaining means, in which the energy application means is adapted to direct an energy to the subject material, or an energy absorbent component disposed thereon, such that the subject material is set in the tubular shape, and in which the tube maintaining means is adapted to maintain the subject material in the tubular shape during absorption of the energy.

17 Claims, 7 Drawing Sheets

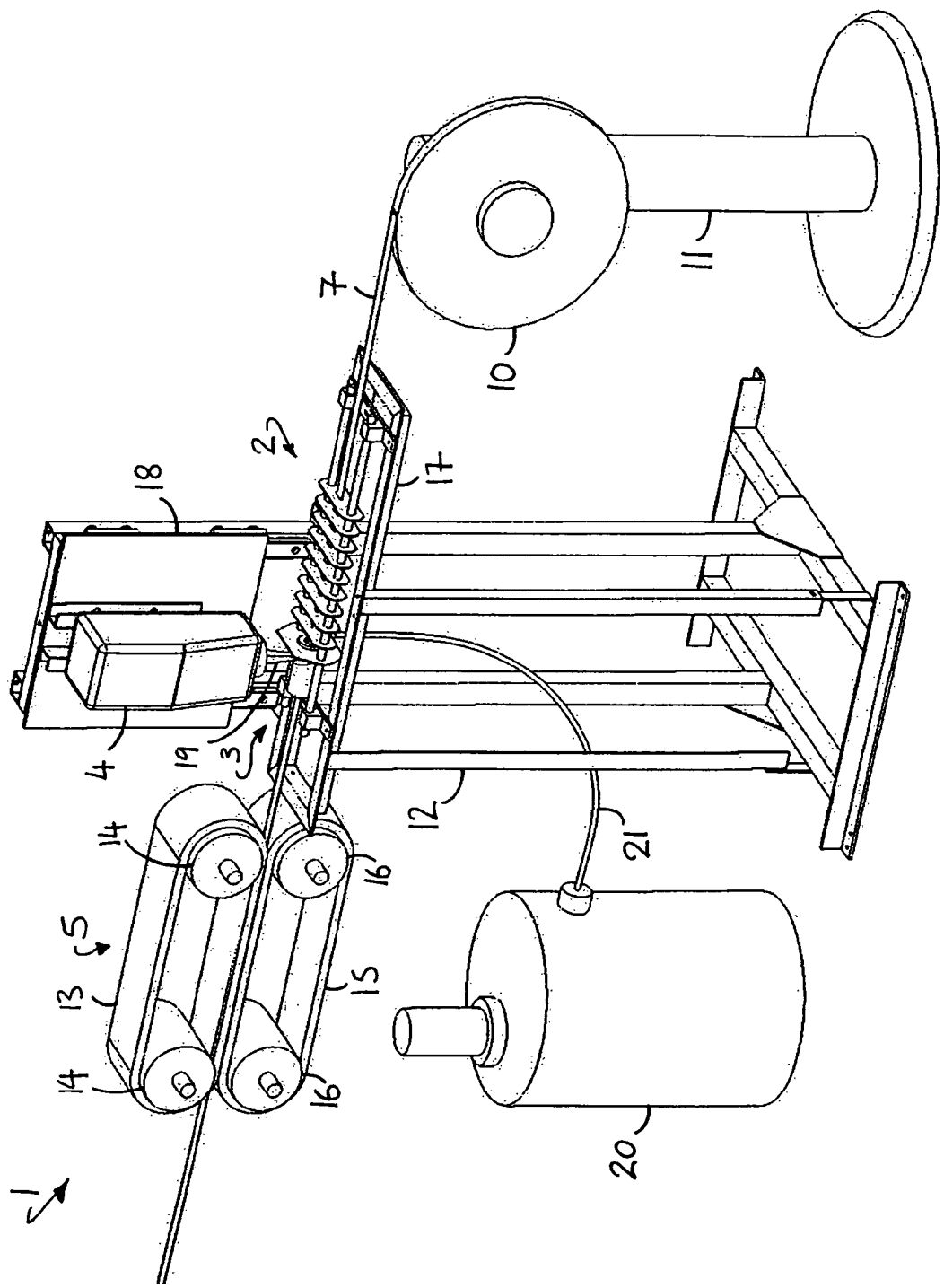

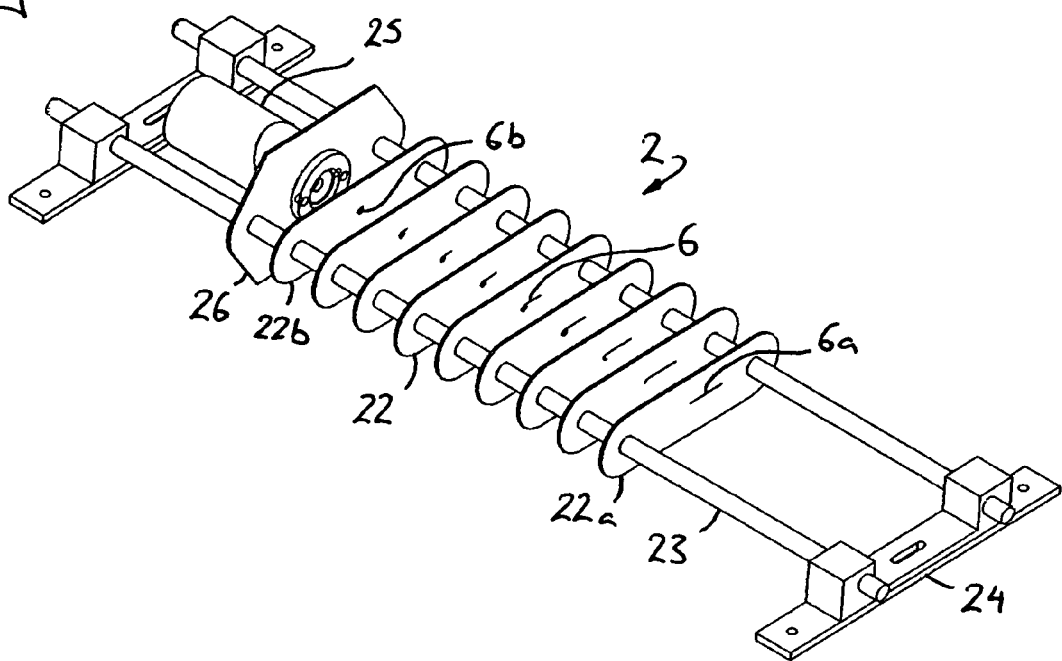
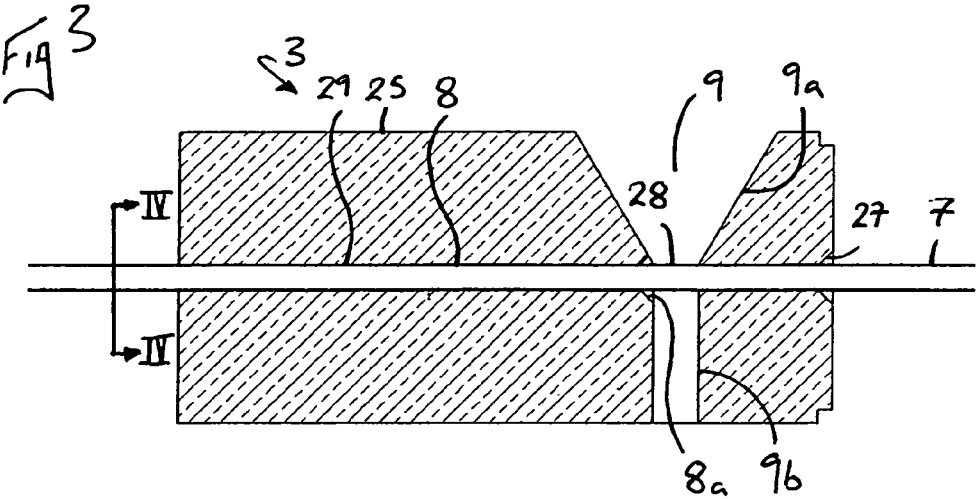

7

30 31 32

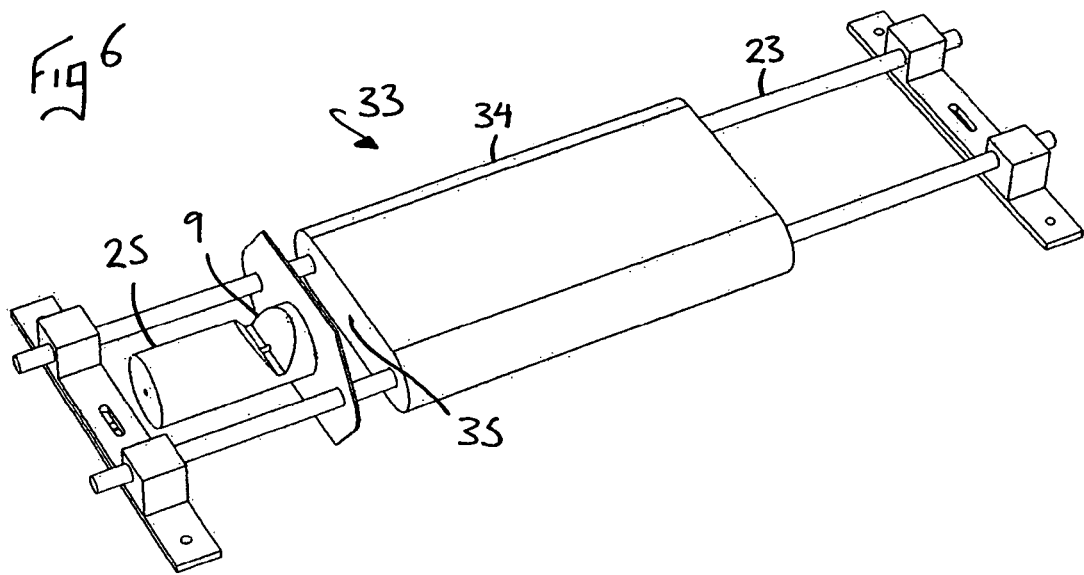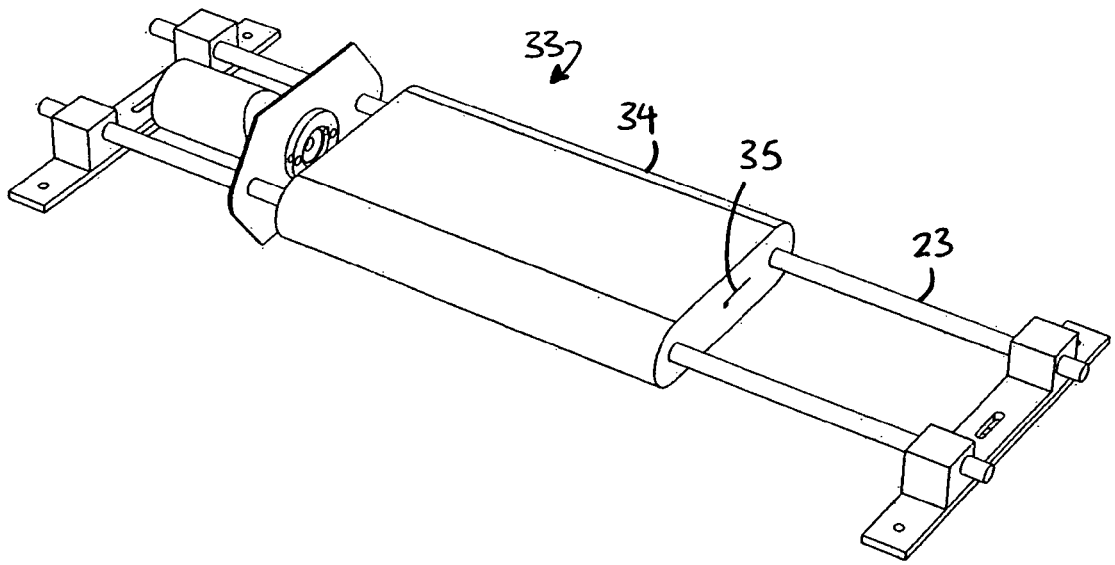

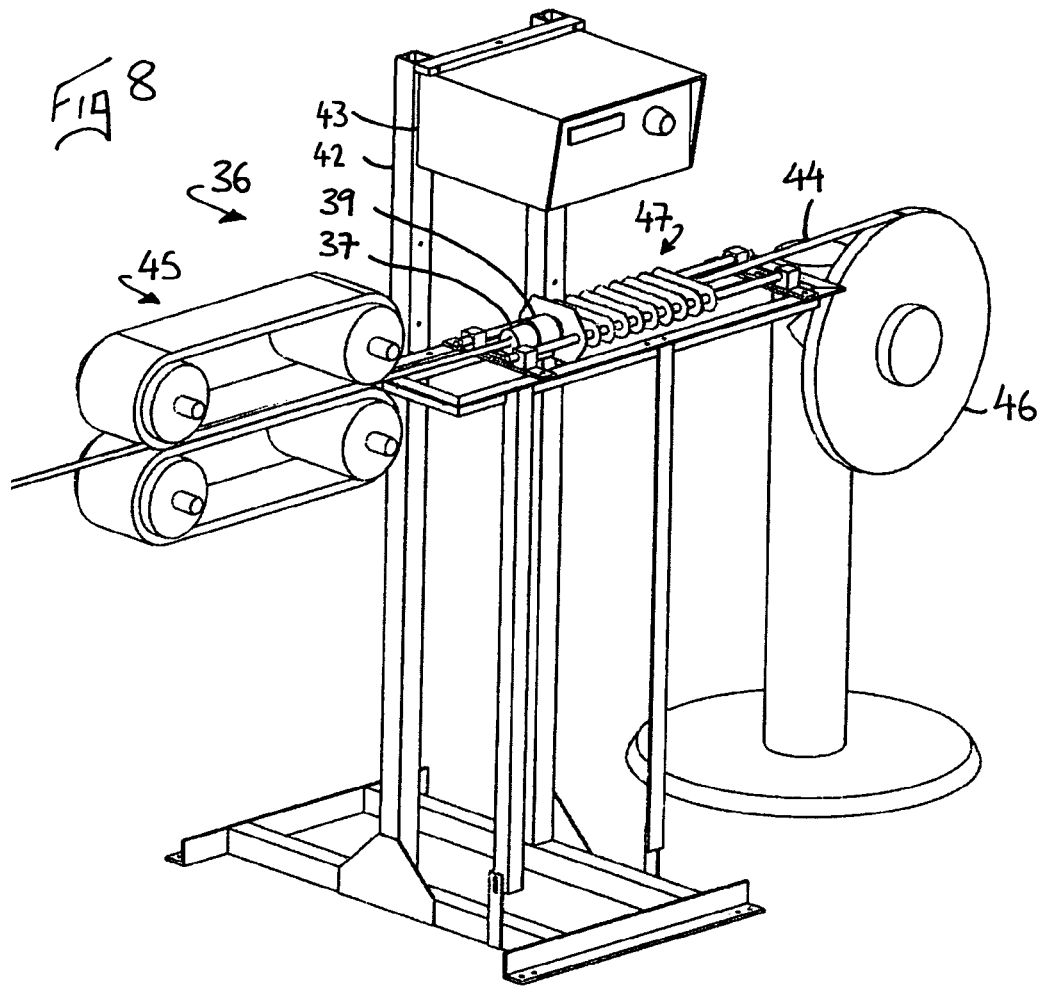
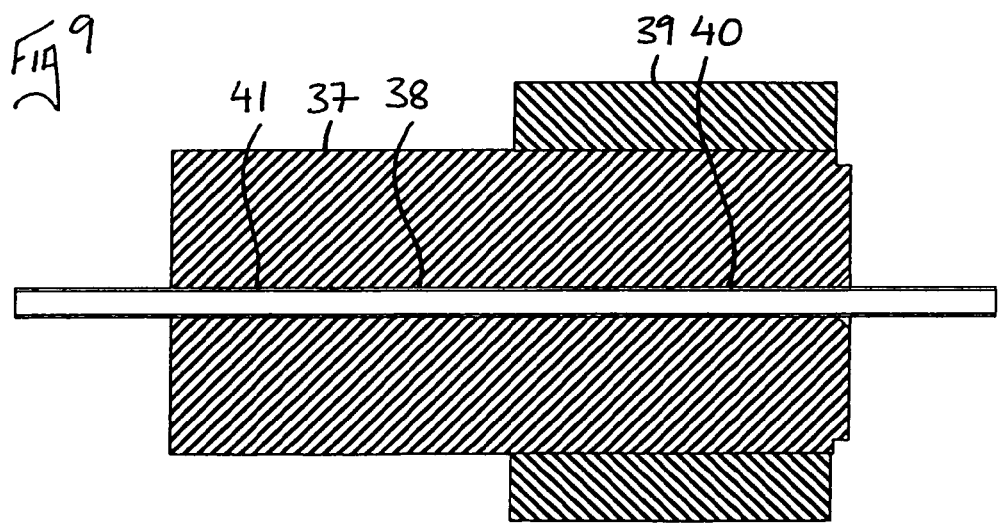

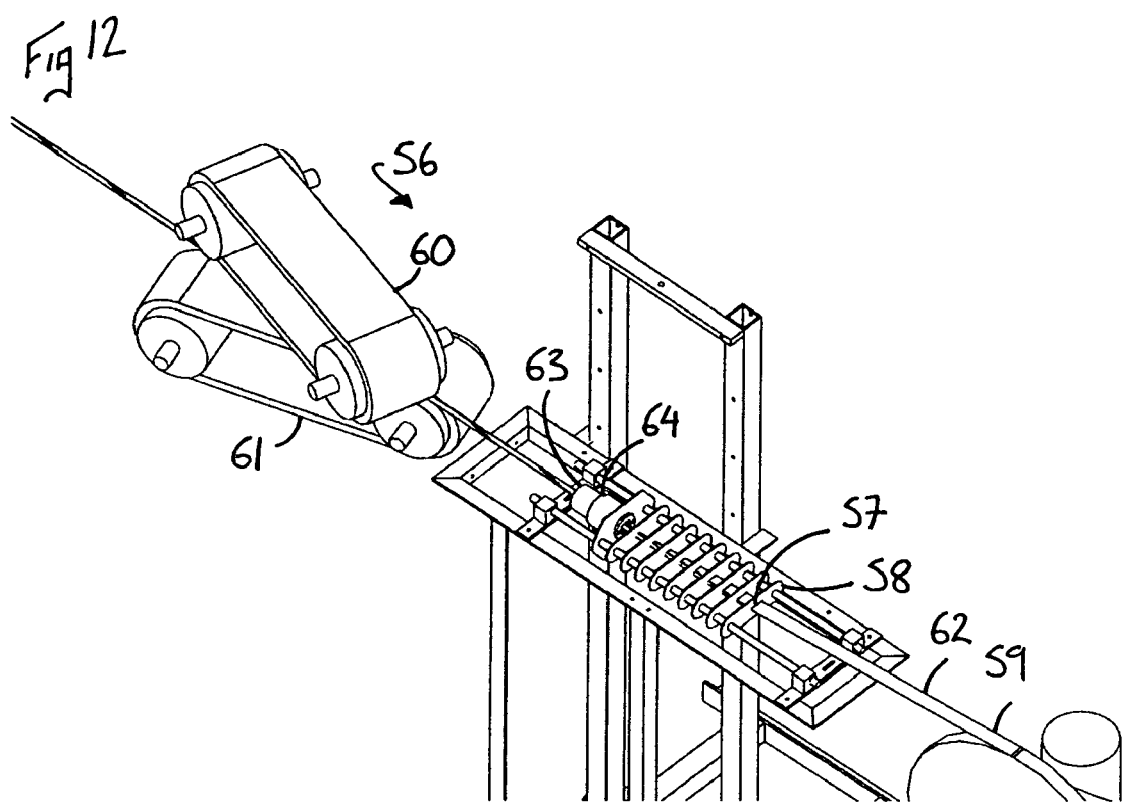

APPARATUS FOR MANUFACTURING A TUBULAR PRODUCT

The Applicants claim priority to Great Britain Application Number 0723936.1 filed on Dec. 7, 2007.

This invention relates to apparatus for manufacturing a tubular product, for use particularly, but not exclusively, to produce electrical insulation tubing.

Electrical insulation tubing is generally used to electrically insulate joints in wires, such as those found within the windings in electrical motors. Such tubing is constructed from multiple thin layers of electrically insulating material such as polyester. These products take a variety of forms, and are manufactured using many different methods.

One type of tube is manufactured from several narrow strips of an electrically insulating polymer, which are each coated with adhesive and applied to a cylindrical mandrel at an oblique angle, so a continuous length of tube with helical joints is formed. The tube can be cut to length later.

Another type of tube is produced by rolling a short length of electrically insulating polymer onto a cylindrical mandrel at a perpendicular angle thereto, such that a tube with a spiral cross-section is formed, which is already of the desired length. Tubes like this are prevented from unwinding by attaching the layers to each other with ultrasonic welding or an adhesive, or by permanently deforming the material by heating it. Such a construction of tubing is shown in JP2000067674A.

The adhesives used to construct the types of tubing described above are detrimental to the environment, and add cost to the manufacturing process. Where welding or deformation are used as a means to attach one layer of material to another, the welding or deformation is applied to the entire thickness of the tube wall, which is detrimental to the insulating properties. In addition, such methods are not particularly reliable.

A new type of material welding has now been invented, known as through transmission laser welding. In one particular arrangement a laser absorber material is positioned between two non laser absorbing materials, and a laser is applied to the absorber such that it melts and forms a weld between the two non laser absorbing materials. This type of material welding is relatively new, and an example of an invention which utilizes this technology is shown in EP1785260.

The invention is intended to provide a novel approach to manufacturing a tubular product, which finds application with through transmission laser welding, but which can also advantageously be used to manufacture tubular products using adhesives, or heat settable subject materials.

Therefore, according to a first aspect of the present invention apparatus for manufacturing a tubular product comprises a tube forming means, a tube maintaining means, a drawing means and energy application means, in which the tube forming means comprises a formation aperture or series of apertures adapted to form a subject material drawn therethrough into a tubular shape, in which the tube maintaining means comprises a circular aperture or series of apertures adapted to maintain the subject material drawn therethrough in the tubular shape, in which the drawing means is adapted to draw the subject material through the tube forming means and the tube maintaining means, in which the energy application means is adapted to direct an energy to the subject material, or an energy absorbent component disposed thereon, such that the subject material is set in the tubular shape, and in which the tube maintaining means is adapted to maintain the subject material in the tubular shape during absorption of the energy.

In one version of the invention the formation aperture or series of apertures can be adapted to form a subject material drawn therethrough into a tubular shape in which a first portion overlies a second portion, and an energy absorbent component can be disposed between the first portion and the second portion, which is adapted to fix the first portion to the second portion when the energy is applied thereto.

The energy absorbent component can be formed as an integral part of the subject material during formation thereof. Such a construction is known in the field of through transmission laser welding in general so could be used in versions of the invention in which that technology were used to set the subject material in the tubular shape. In addition, it is also possible to impregnate an adhesive into a subject material, so such a construction could also be used in versions of the invention in which a heat activated adhesive were used to set the subject material in the tubular shape.

However, whilst this is a possibility in the present case, it may not be ideal because the invention is preferably used to form a tubular product from known reels of polymeric tape, which are readily available.

Therefore in some versions of the invention the apparatus can comprise an energy absorbent component application means adapted to apply an energy absorbent component to the first portion and/or the second portion prior to the first portion being arranged over the second portion in the tube forming means. How the application device functions and is orientated in use may determine which of these options is chosen.

Where through transmission laser welding is used the application means can comprise a felt tip applicator, a hypodermic needle applicator or anything similar which can apply the laser absorbent component to the subject material immediately prior to, or during, its passage through the tube maintaining means. Where a heat activated adhesive is used the application means can comprise a similar device, or a brush. Alternatively, in either instance, the application device can be a pre-printing or coating application device which can apply the energy absorbent component to the subject material some time before the subject material is applied to the tube forming means.

The energy absorbent component can be provided intermittently such that a series of fixtures are formed between the first portion and the second portion. Such an arrangement can be used to save on raw materials, and if the end product can function adequately as such. However, as an alternative to this, the energy absorbent component can be provided continuously such that a continuous fixture is formed between the first portion and the second portion.

However the subject material is set in the tubular shape, the tube forming means can be adapted to form a subject material drawn therethrough into a tubular shape in which the subject material is wound on itself parallel to an axis of the tubular shape. This can be achieved by aligning the formation aperture or series of apertures along a production axis, and feeding the subject material to the formation aperture or series of apertures in line with said production axis. As such, in versions in which an energy absorbent component is used, the apparatus will produce a simple tubular product with a straight weld along one side.

However, as an alternative to this the tube forming means can be adapted to form a subject material drawn therethrough into a tubular shape in which the subject material is wound on itself in a helical manner about an axis of the tubular shape. This can be achieved by feeding the subject material to the formation aperture or series of apertures at an oblique angle to said production axis. Alternatively, the formation aperture or series of apertures themselves can be arranged at an oblique angle to a production axis with which the tube maintaining means is aligned, and the subject material can be feed to the formation aperture or series of apertures in line with that oblique angle. In such versions of the invention in which an energy absorbent component is used, the apparatus will produce an end product with a helical weld, which may be appropriate for certain applications, in particular those where a loading may be applied.

In order to facilitate the production of the helical shape the drawing means can be adapted to rotate the tubular shape on its own axis when it draws the tubular shape through the tube maintaining means.

The formation aperture or series of apertures can be adapted to wind the subject material through at least 720 degrees. As such, the apparatus produces an end product in which the subject material is rolled on itself a number of times, and benefits from superior strength.

In one version of the invention the energy application means can comprise a laser projector and the energy can comprise laser light. The subject material can be non-laser absorbent, and the energy absorbent component application means can comprise a laser absorbent component application means. The laser projector can be adapted to direct laser light adapted to be absorbed by the laser absorbent component through the first portion and at the laser absorbent component, such that a weld is formed which results in said first portion and said second portion being affixed together.

This version of the invention is beneficial because the subject material is formed into a tubular product without any damage being caused to the subject material itself, at or around the weld point, since the weld depth in through transmission laser welding is only a few microns into the two surfaces to be joined.

The tube maintaining means can comprise a block provided with a circular aperture therethrough, and a laser application aperture can be provided in said block at an angle to said circular aperture. As such the subject material is held in position during the application of the laser light.

The circular aperture can comprise a secondary section beyond the laser application aperture which can be adapted to provide a post welding compression force and/or a post welding cooling to the subject material for sufficient time to allow for the formed weld to set.

In a different version of the invention the energy application means can comprise a heater and the energy can comprise heat. The energy absorbent component application means can comprise a heat activated adhesive component application means. The heater can be adapted to direct heat adapted to be absorbed by the heat activated adhesive component to the heat activated adhesive component such that a join is formed which results in said first portion and said second portion being affixed together. This alternative version of the invention is also beneficial because the subject material is formed into a tubular shape without any damage being caused to the subject material itself.

As above, the tube maintaining means can comprise a block provided with a circular aperture therethrough, but the heater can comprise a band heater applied to a primary section of said circular aperture to heat it. Again, the circular aperture can comprise a secondary section beyond the band heater which can be adapted to provide a post heating compression force and/or a post heating cooling to the subject material for sufficient time to allow for the formed join to set.

In a third distinct version of the invention the energy application means can comprise a heater and the energy can comprise heat, but the apparatus can be adapted to simply heat the subject material such that it sets into said tubular shape. This version of the invention produces an end product which is formed into a tubular shape, but which can be unrolled for the purpose of applying it to a damaged section of insulation.

In this version of the invention the formation aperture or series of apertures can be adapted to form a subject material drawn therethrough into a tubular shape comprising a tubular section with a flat lateral section extending therefrom, and the tube maintaining means can comprise a block provided with an aperture therethrough comprising a circular section and a flat lateral section extending therefrom. As such, the end product comprises a flat flap which sticks out, which facilitates its ready unrolling in use.

In this version of the invention the heater can also comprise a band heater applied to a primary section of said aperture, and the aperture can comprise a secondary section beyond the band heater which is adapted to provide a post heating compression force and/or a post heating cooling to the subject material for sufficient time to allow for the formed tubular shape to set.

Regardless of the manner in which the tubular product is produced, the drawing means can comprise an upper and a lower track disposed beyond the tube maintaining means, which travel in opposite directions and which act on the formed tube extending from the tube maintaining means to draw the subject material through the tube forming means and the tube maintaining means.

In versions of the invention in which a helical tubular product is produced, the upper and the lower track can be arranged at an oblique angle to one another such that the formed tube is rotated on its own axis when it is drawn therethrough.

The invention also includes the end product referred to above. Therefore, according to a second aspect of the present invention, a tubular product is provided as manufactured by the apparatus of the claimed invention.

The invention can be performed in various ways, but five embodiments will now be described by way of example and with reference to the accompanying drawings, in which:

FIG. 1 is a perspective view of a first apparatus for manufacturing a tubular product according to the first aspect of the present invention;

FIG. 2 is a perspective view of components of the apparatus as shown in FIG. 1;

FIG. 3 is a cross-sectional side view of a component of the apparatus as shown in FIG. 1;

FIG. 6 is a perspective view of an alternative component to that shown in FIG. 2 for use in creating a second apparatus according to the first aspect of the present invention;

FIG. 7 is a perspective view of the component shown in FIG. 6;

FIG. 8 is a perspective view of a third apparatus according to the first aspect of the present invention;

FIG. 9 is a cross-sectional side view of a component of the apparatus as sown in FIG. 8;

FIG. 12 is a perspective view of a fifth apparatus according to the first aspect of the present invention.

Figure 4:
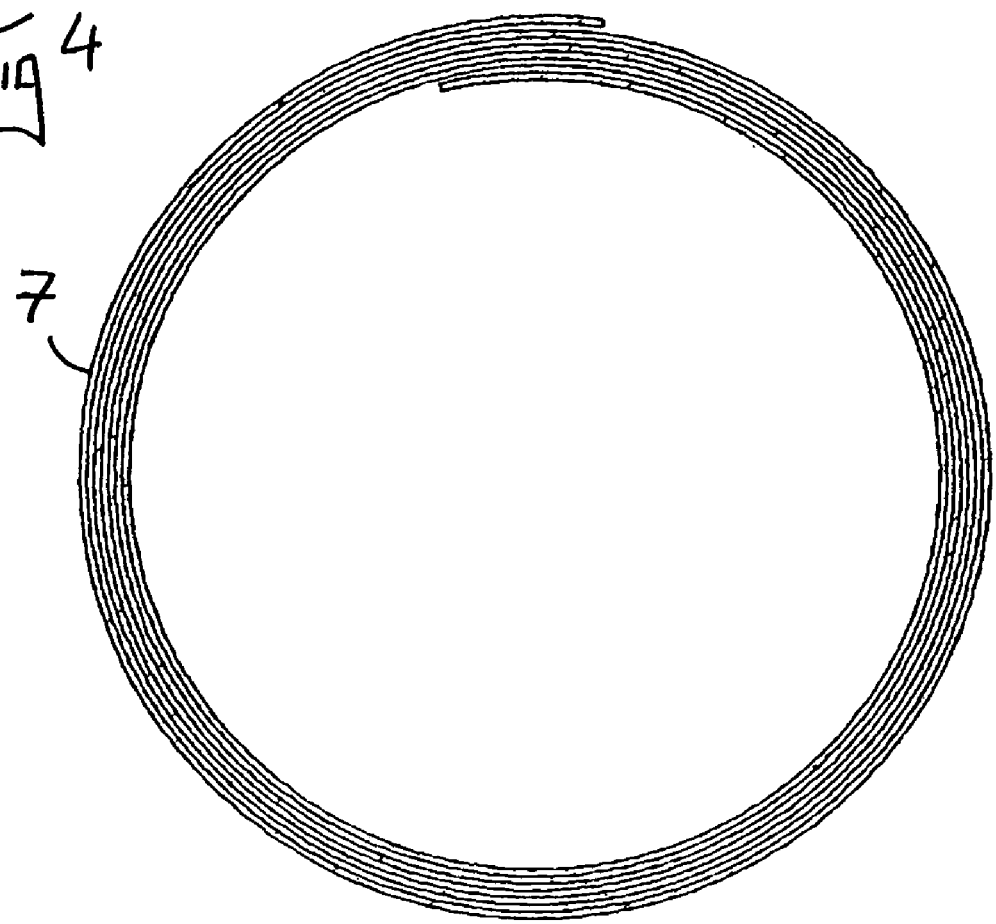
FIG. 4 is a cross-sectional end view of a first tubular product according to the second aspect of the present invention, which was manufactured using the apparatus shown in FIG. 1.

Therefore, as shown in FIG. 1, apparatus for manufacturing a tubular product 1 comprises a tube forming means 2, a tube maintaining means 3, a drawing means 5 and energy application means, in the form of laser projector 4. Referring to FIG. 2, which shows the tube forming means 2 in more detail, it comprises a series of apertures 6 adapted to form a subject material 7 into a tubular shape. Referring to FIG. 3, which shows the tube maintaining means 3 in more detail, it comprises a circular aperture 8 adapted to maintain the subject material 7 drawn therethrough in the tubular shape. As explained further below, the drawing means 5 is adapted to draw the subject material 7 through the tube forming means 2 and the tube maintaining means 3. As is also explained further below, the laser 4 is adapted to direct a laser beam 19 to a laser absorbent component disposed on the subject material, such that the subject material 7 is set in the tubular shape, and the tube maintaining means 3 is adapted to maintain the subject material 7 in the tubular shape during absorption of the laser beam 19.

The apparatus 1 comprises a number of separate components which are arranged adjacent one another. The subject material 7 is a polymeric tape provided on a reel 10, which is mounted for rotation on a stand 11. The tube forming means 2, the tube maintaining means 3 and the laser 4 are mounted on a framework 12. The drawing means 5 comprises an upper track 13 mounted on a pair of upper rollers 14, and a lower track 15, mounted on a pair of lower rollers 16. The upper rollers 14 are driven in a clockwise direction by associated machinery (not shown), which supports them in the position shown. The lower rollers 16 are driven in an anti-clockwise direction by said machinery. The stand 11 and the drawing means 5 are known.

The tube forming means 2, the tube maintaining means 3 and the drawing means 5 are arranged on a production axis, so the subject material is drawn through these components in a straight line. As the reel 10 changes in size during use, the subject material 7 may not leave the reel 10 precisely aligned with the production axis, as it may be above or below it. However, reel 10 is arranged in a plane which is parallel with the production axis so the subject material 7 is always in line with the production axis. From the drawing means 5 the manufactured tubular product is directed to cutting and packaging machinery (not shown).

The framework 12 comprises a lateral section 17 which supports the tube forming means 2 and the tube maintaining means 3, such that the apertures 6 and the circular aperture 8 are arranged along said production axis. The framework 12 further comprises a laser mounting plate 18 which supports the laser 4 above the tube maintaining means 3, such that a laser beam 19 which the laser 4 produces is normal to the production axis, and is directed through the laser application aperture 9.

The apparatus 1 further comprises laser absorbent component application means, only a few components of which are visible in FIG. 1. The application means comprises a fabric applicator which is saturated with the laser absorbent component. The applicator is kept stocked with a supply of the laser absorbent component by a small pump, which is supplied from a drum 20 by line 21. The fabric applicator is similar to the tip of a felt-tip pen, and it effectively "draws" a line of the laser absorbent component onto the subject material 7 immediately prior to its entry into the tube maintaining means 3.

The laser absorbent component which is one of many commercially available dyes which are suitable for welding with a laser wavelength of 940 nm. The laser 4 is a ROFIN DLO18 diode laser, which has a laser wavelength of 940 nm+/−10 nm, operating at about 200 w. The drawing means 5 operates to draw the subject material past the laser beam 19 at a speed of substantially five metres per minute, which is sufficient for the through transmission laser welding to operate effectively. (It will be appreciated that the type of dye and the laser which are used can be any known type, provided the wavelength of the laser is appropriate for use with the dye and visa versa. In addition, the speed the drawing means operates can be adjusted if required to suit a particular dye and laser configuration.)

Referring to FIG. 2, the tube forming means 2 comprises a series of nine aperture plates 22, which are mounted on a pair of parallel mounting bars 23. The mounting bars 23 are supported at their ends by blocks plates 24, which are fixed to the framework 12. Each of the aperture plates 22 has an aperture 6, and the apertures 6 progress from a flat aperture 6a in the first aperture plate 22a, to a mostly circular aperture 6b in the final aperture plate 22b. Each of the apertures 6 after the first aperture 6a has a curved section at one end, and a flat section at the other. At first each progressive aperture 6 has a greater curved section and a lesser flat section than the last, until the curved section is circular. From that point onwards the flat section gets progressively smaller. As a result, when the subject material 7 is drawn through these apertures 6, it is turned from its flat shape into a rolled shape with a short flat section extending therefrom.

The tube maintaining means 3 comprises a block 25, which is mounted on plate 26, which is itself supported by the mounting bars 23. The block 25 has the circular aperture 8, and a laser application aperture 9 formed therein. The circular aperture 8 is aligned on the production axis with the aperture 6b, so the subject material 7 travels from the last aperture 6b directly into the circular aperture 8, and as it does so it is turned from a rolled shape with a short flat section extending therefrom, into a completely rolled shape. The circular aperture 8 has a chamfered first end 27 to prevent any undue resistance in use.

As such, the circular aperture 8 forms the final part of the tube forming process. The circular aperture 8 has a circumference which is slightly under a quarter the length of the flat aperture 6a, and as such the subject material 7 is rolled just over four times, as illustrated in FIG. 4. When inside the circular aperture 8 the subject material 7 is maintained in its tubular configuration, as shown in FIG. 3.

The laser application aperture 9 comprises a top part 9a which is tapered so it does not interfere with the laser beam 19, which is focussed on a point 28, where it meets the subject material 7 travelling through the circular aperture 8. The laser application aperture 9 also comprises a bottom part 9b below the point 28, such that energy from the laser beam 19 which passes through the subject material 7 also passes through the block 25 and does not heat it. The circular aperture 8 is chamfered at 8a where it continues after the laser application aperture 9, to prevent any undue resistance in use.

The circular aperture 8 comprises a secondary section 29 beyond the laser application aperture 9, which is adapted to provide a post welding compression force and a post welding cooling to the subject material 7 to allow for a weld 30 formed at the point 28 to set. The compression force is provided simply by virtue of maintaining the subject material 7 in its rolled shape inside the circular aperture 8. The cooling is provided by virtue of the generated heat being absorbed into the body of the block 25.

Figure 5:
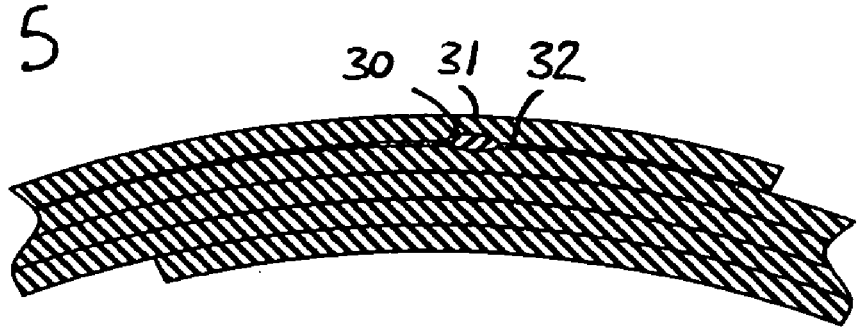
FIG. 5 is an enlarged cross-sectional end view of a portion of the tubular product shown in FIG. 4.

The above referred to fabric applicator (not shown in FIGS. 2 and 3) is arranged between the aperture plate 22b and the plate 26, and it applies a line of laser absorbent component onto the subject material immediately prior to its entry into the circular aperture 8. The laser absorbent component is applied to the side of the roll at a point where the final part of the subject material 7 which is still flat at that point, will overlie the roll when the subject material enters the circular aperture 8. FIG. 5 illustrates this, and shows how the finished weld 30 is arranged between a first portion 31 and a second portion 32 over which it lies.

In use the reel 10 is mounted on the stand 11, and the subject material 7 is drawn therefrom and threaded through the tube forming means 2, the tube retaining means 3, and the drawing means 5. The drawing means 5 and the laser 4 are then switched on, and the subject material 7 is drawn from the reel 10 automatically, at a speed of substantially five metres per minute.

When the subject material 7 passes through the apertures 6 and into circular aperture 8, it is urged into a roll, as illustrated in FIG. 4. As the subject material 7 is rolled just over four times, the second portion 32 overlies two further portions at most points, and three under the weld 30, due to the extra overlap. With this construction the end product benefits from superior strength and electrical insulation properties at all points.

Just prior to this roll being completed, the laser absorbent component is applied to the side of the roll at a point where the final part of the subject material 7 which is still flat at that point, will overlie the roll when the subject material 7 enters the circular aperture 8.

When the subject material 7 passes point 28 the laser beam 19 passes through the first portion 31 of the subject material 7, and is absorbed by the laser absorbing component, such that a weld 30 is formed. The weld 30 sets and cools as the subject material 7 passes through the secondary section 29 of the block 25. The end product then passes through the tracks 13 and 15, and is directed to cutting and packaging machinery (not shown).

The apparatus described above can be altered without departing from the scope of the Claims. In particular, FIGS. 6 and 7 show an alternative tube forming means 33 which can replace the plates 22. It comprises a block 34, with a single shaped aperture 35 passing therethrough. The shaped aperture 35 comprises a circular section and a flat section, and as the aperture 35 passes through the block 34 the flat section decreases in size. The subject material 7 enters the aperture 35 in the flat section, and as it passes therethrough it is urged into a roll, in a similar way to that described above. (The aperture 35 has a circular section passing all the way through as this is easier to manufacture than an aperture which follows the exact shapes of the apertures 6 described above.) The block 34 is mountable on the same mounting bars 23 as the aperture plates 22 described above. (FIG. 6 also provides a good view of the block 25, and in particular the laser application aperture 9.)

Further, as referred to above, the invention also includes apparatus in which the energy application means is a heater and the energy comprises heat, and such an apparatus 36 is shown in FIGS. 8 and 9. Apparatus 36 is the same as apparatus 1 described above, except that instead of through transmission laser welding being used to set the tubular product, a heat activated adhesive is employed instead. Therefore, the block 37 simply comprises circular aperture 38, and a band heater 39 is mounted around the block 37 to heat it. The band heater 39 is mounted around a primary section 40 of the circular aperture 38, and the circular aperture 38 comprises a secondary section 41 beyond the band heater 39 which provides a post heating compression force and cooling to the subject material for sufficient time to allow for a formed join to set. The framework 42 supports a control box 43 which powers and controls the band heater 39.

In the case of the arrangement shown in FIG. 8, the subject material 44 comprises a polymeric tape which has a heat activated adhesive pre-printed onto the whole of one side of it. Therefore, in use the drawing means 45 draws the subject material 44 from reel 46 and through the tube forming means 47 and the block 37. When the subject material 44 passes through the apertures (not visible) of the tube forming means 47 it is urged into a roll, like that shown in FIG. 4. The band heater 39 heats the block 37 to 150 degrees Centigrade, and when the subject material passes through the primary section 40 of the circular aperture 38 the provided heat activates the adhesive and the subject material 44 is set in the tubular shape. As the adhesive is provided on the whole of one side of the tape, all parts of the formed roll which contact one another are fixed together. As the produced tubular product passes through the secondary section 41 of the circular aperture 38 it cools down and sets. The end product then passes through the drawing means 45 and is directed to cutting and packaging machinery (not shown), or to a further heating or curing process.

The apparatus 36 shown in FIGS. 8 and 9 can also be used to produce a tubular product from a tape which does not have a heat activated adhesive pre-printed thereon. In such circumstances a heat activated adhesive application device (not shown) is provided which operates in a similar way to the laser absorbent component application means shown in FIG. 1. In particular, a fabric applicator which is saturated with the heat activated adhesive is arranged either before or after the tube forming means 47, and it applies a line of the adhesive directly onto the passing subject material 44.

The apparatus 36 can also be used to produce a tubular product in which no adhesive is used, rather the subject material is set into a tubular shape via the application of heat. In such circumstances a particular type of heat curable tape is used as the subject material, and when it passes through the block 37 the applied heat sets the subject material in the formed shape. As such the end product can be unrolled for the purpose of applying it to a damaged section of insulation.

Figure 10:
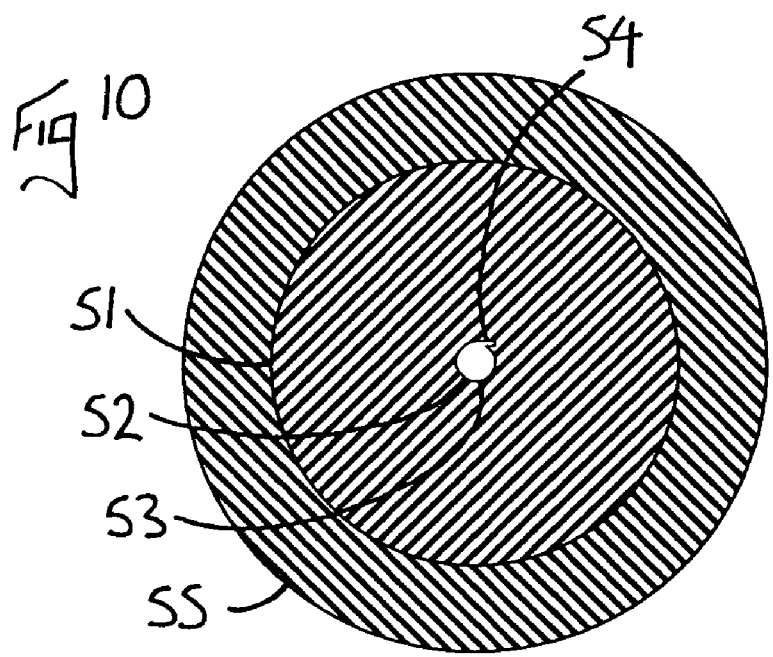
FIG. 10 is an end view of an alternative component to that shown in FIG. 9 for use in creating a fourth apparatus according to the first aspect of the present invention.
Figure 11:
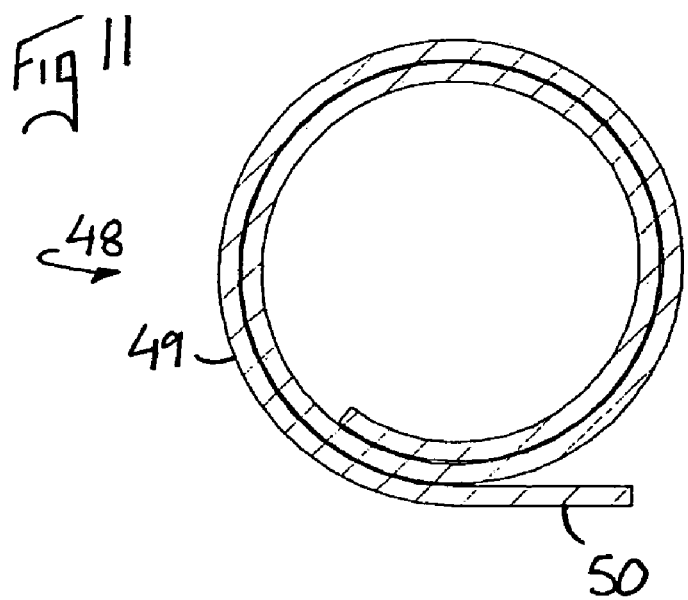
FIG. 11 is a cross-sectional end view of a second tubular product according to the second aspect of the present invention, which was manufactured using the apparatus using the component shown in FIG. 10.

The apparatus can be altered slightly to produce a particular advantageous shape of unrollable tubular product which is shown in FIG. 11. The tubular product 48 comprises a roll of material 49 with a flat lateral section 50 extending therefrom, which facilitates its ready unrolling in use. In order to produce this product the apertures (not visible) in the tube forming means 47 are adapted to only roll the subject material up into the shape shown in FIG. 11, (which is in fact the case with apertures 22 described above.) In addition an alternative block 51, as shown in FIG. 10, is used, which comprises an aperture 52 comprising a circular section 53 and a flat lateral section 54 extending therefrom. As such, the aperture 52 maintains the subject material in the desired shape when it is heated by the band heater 55, so it sets in that shape.

In all the above described embodiments the reel 10 or 46 is arranged in a plane which is parallel with the production axis, so the subject material is wound on itself parallel to an axis of the formed tubular shape.

However, FIG. 12 shows an alternative apparatus 56 which is adapted to produce a tubular product comprising a helical shape. Apparatus 56 comprises the same basic components as apparatus 36 described above, and in particular they are arranged in relation to the same production axis, however they are configured differently thereto. In particular, the apertures 57 in the aperture plates 58 are arranged along an oblique angle to the production axis, and the reel 59 is arranged in a plane which is aligned with said oblique angle. In addition, the upper and lower tracks 60 and 61 are offset in relation to the production axis, such that the end product is rotated on its own axis as it is drawn through the apparatus. Therefore, the subject material 62 is rolled into a helical shape by the aperture plates 58, and it is rotated on its own axis as it is drawn through the block 63.

In apparatus 56 a band heater 64 is used to activate a heat activated adhesive component pre printed onto the subject material 62, as in the arrangement shown in FIG. 8. However, it will be appreciated that the alterations made in order to produce a tubular product wound in a helical way can also be applied to the apparatus 1 shown in FIG. 1. However, when this is done the laser and the block need to be precisely positioned such that the rotating line of applied laser absorbent component passes the point where the laser meets the subject material. The block can be moved on the support bars if any adjustment is required.

The second aspect of the present invention defines a tubular product manufactured by the apparatus described above, and the tubular products shown in FIG. 4 and FIG. 11 provides support for this.

The above described embodiments can be further altered without departing form the scope of the Claims. In particular, in another alternative construction (not shown) apparatus is the same as that shown in FIG. 1, except no laser absorbent component application means are provided, and a laser absorbent component is formed as an integral part of the subject material during formation thereof. The laser absorbent component is formed in the subject material at a point where the outermost part of the formed roll overlies an inner section, such that it is arranged much in the same place as the laser absorbent component applied by the apparatus 1 described above. As such, the application of the laser beam will result in a weld being formed much as described above. Subject materials with laser absorbent components formed therein are known in the field of through transmission laser welding in general.

In other alternative constructions (not shown) the energy absorbent component application means is arranged such that the energy absorbent component is applied to the remaining flat section of the subject material immediately prior to its entry into the circular aperture, as opposed to the side of the formed roll. As such the energy absorbent component is applied to the first portion of the subject material which overlies the second portion.

In other alternative constructions (not shown) the energy absorbent component application means is arranged such that a first applicator applies energy absorbent component to the side of the roll as in apparatus 1, but a second applicator applies energy absorbent component to the remaining flat section of the subject material immediately prior to its entry into the circular aperture. As such the energy absorbent material is applied to both the first and the second portions of the subject material.

In the above described embodiments in which an energy absorbent component is applied to the subject material, it is applied continuously as the subject material passes through the apparatus. However, in alternative constructions (not shown) the energy absorbent component application means are arranged such that the energy absorbent component is applied intermittently to the first and/or the second portions of the subject material, such that a series of welds or joins are formed. This can be achieved by providing an applicator with a timed reciprocal action, for example by mounting it on a turning cam.

Therefore apparatus are provided which allow for through transmission laser welding to be used to manufacture a tubular product, but which can also be used to manufacture tubular products using heat activated adhesives and heat settable subject materials. The end products are robust and strong and do not suffer from deterioration or weakness at the point where they are joined together as in known designs.

The invention claimed is:

1. An apparatus for manufacturing a tubular product comprising a tube forming means, a tube maintaining means, a drawing means and energy application means, in which the tube forming means comprises a block having a formation aperture passing therethrough, adapted to form a subject material drawn therethrough into a tubular shape, the formation aperture adapted to wind the subject material through at least 720 degrees on itself around an axis of the tubular shape, wherein the formation aperture comprises a circular section and a flat section, and, as the formation aperture passes through the block in the direction of travel of the subject material, the flat section decreases in size, in which the tube maintaining means comprises a circular aperture or series of apertures adapted to maintain the subject material drawn therethrough in the tubular shape, in which the drawing means is adapted to draw the subject material through the tube forming means and the tube maintaining means, in which the energy application means is adapted to direct an energy to the subject material, or an energy absorbent component disposed thereon, such that the subject material is set in the tubular shape, and in which the tube maintaining means is adapted to maintain the subject material in the tubular shape during absorption of the energy.

2. The apparatus of claim 1 wherein the formation aperture is adapted to form a subject material drawn therethrough into a tubular shape in which a first portion overlies a second portion, in which an energy absorbent component is disposed between the first portion and the second portion, and in which the energy absorbent component is adapted to fix the first portion to the second portion when the energy is applied thereto.

3. The apparatus of claim 2 wherein the apparatus comprises an energy absorbent component application means adapted to apply an energy absorbent component to the first portion and/or the second portion prior to the first portion being arranged over the second portion I the tube forming means.

4. The apparatus of claim 3 wherein the energy application means comprises a laser projector and the energy comprises laser light, in which the energy absorbent component application means comprises a laser absorbent component application means, and in which the laser projector is adapted to direct laser light adapted to be absorbed by the laser absorbent component through the first portion and at the laser absorbent component, such that a weld is formed which results in said first portion and said second portion being affixed together.

5. The apparatus of claim 4 wherein the tube maintaining means comprises a block provided with a circular aperture therethrough, in which a laser application aperture is provided in said block at an angle to said circular aperture, and in which the circular aperture comprises a secondary section beyond the laser application aperture which is adapted to provide a post welding compression force and/or a post welding cooling to the subject material for sufficient time to allow for the formed weld to set.

6. The apparatus of claim 3 wherein the energy application means comprises a heater and the energy comprises heat, in which the energy absorbent component application means comprises a heat activated adhesive component application means, and in which the heater is adapted to direct heat adapted to be absorbed by the heat activated adhesive component to the heat activated adhesive component such that a join is formed which results in said first portion and said second portion being affixed together.

7. The apparatus of claim 6 wherein the tube maintaining means comprises a block provided with a circular aperture therethrough, in which the heater comprises a band heater applied to a primary section of said circular aperture, and in which the circular aperture comprises a secondary section beyond the band heater which is adapted to provide a post heating compression force and/or a post heating cooling to the subject material for sufficient time to allow for the formed join to set.

8. The apparatus of claim 2 wherein the energy absorbent component is provided intermittently such that a series of fixtures are formed between the first portion and the second portion.

9. The apparatus of claim 2 wherein the energy absorbent component is provided continuously such that a continuous fixture is formed between the first portion and the second portion.

10. The apparatus of claim 1 wherein the energy application means comprises a heater and the energy comprises heat, and in which the apparatus is adapted to heat the subject material such that it sets into said tubular shape.

11. The apparatus of claim 10 wherein the formation aperture is adapted to form a subject material drawn therethrough into a tubular shape comprising a tubular section with a flat lateral section extending therefrom, and in which the tube maintaining means comprises a block provided with an aperture therethrough comprising a circular section with a flat lateral section extending therefrom, in which the heater comprises a band heater applied to a primary section of said aperture, and in which the aperture comprises a secondary section beyond the band heater which is adapted to provide a post heating compression force and/or a post heating cooling to the subject material for sufficient time to allow for the formed tubular shape to set.

12. The apparatus of claim 1 wherein the drawing means comprises an upper and a lower track disposed beyond the tube maintaining means, in which the upper and the lower track travel in opposite directions and are adapted to act on the formed tube extending from the tube maintaining means to draw the subject material through the tube forming means and the tube maintaining means.

13. The apparatus of claim 12 wherein the upper and the lower track are arranged at an oblique angle to one another such that the formed tube is rotated on its own axis when it is drawn therethrough.

14. An apparatus for manufacturing a tubular product comprising a tube forming means, a tube maintaining means, a drawing means and energy application means,
in which the tube forming means comprises a series of plates each with a formation aperture, the plates of said series together forming a series of aligned apertures adapted to form a subject material drawn therethrough into a tubular shape, the series of apertures being adapted to wind the subject material through at least 720 degrees on itself around an axis of the tubular shape, wherein the said formation apertures each comprise a circular section and a flat section, and wherein the flat sections of the series of apertures get progressively smaller in the direction of travel of the subject material through the aperture plates,
in which the tube maintaining means comprises a circular aperture or series of apertures adapted to maintain the subject material drawn therethrough in the tubular shape,
in which the drawing means is adapted to draw the subject material through the tube forming means and the tube maintaining means,
in which the energy application means is adapted to direct an energy to the subject material, or an energy absorbent component disposed thereon, such that the subject material is set in the tubular shape,
and in which the tube maintaining means is adapted to maintain the subject material in the tubular shape during absorption of the energy.

15. The apparatus of claim 14 wherein the formation of the series of aligned apertures is adapted to form a subject material drawn therethrough into a tubular shape in which a first portion overlies a second portion, in which an energy absorbent component is disposed between the first portion and the second portion, and in which the energy absorbent component is adapted to fix the first portion to the second portion when the energy is applied thereto.

16. The apparatus of claim 14 wherein the energy application means comprises a heater and the energy comprises heat, and in which the apparatus is adapted to heat the subject material such that it sets into said tubular shape.

17. The apparatus of claim 14 wherein the drawing means comprises an upper and a lower track disposed beyond the tube maintaining means, in which the upper and the lower track travel in opposite directions and are adapted to act on the formed tube extending from the tube maintaining means to draw the subject material through the tube forming means and the tube maintaining means.

* * * * *